2,863,782
LOW-MELTING HIGH-EXPANSION GLASS

William R. Eubank, Troy Township, St. Croix County, Wis., and Warren R. Beck, Mahtomedi, Minn., assignors to Minnesota Mining & Manufacturing Company, St. Paul, Minn., a corporation of Delaware No Drawing. Application July 22, 1955
Serial No. 523,930

20 Claims. (Cl. 106—47)

This invention relates to novel low-melting, high expansion glass compositions and to articles including such compositions as a part of their structure.

For many years efforts have been directed, without success, toward providing the electrical industry with an insulating glass composition which has a coefficient of thermal expansion high enough to match that of copper, which has a linear thermal expansion coefficient of about $17 \times 10^{-6}$ per ° C. As an example, in his book Glass to Metal Seals, published by the Society of Glass Technology, Sheffield, England, 1949, J. W. Partridge states on page 56: "The thermal expansion of copper does not match that of any glass. . . ." Recently, certain alkali silicate glasses have been made with comparatively high thermal expansion coefficients; however, they generally exhibit poor electrical insulating properties, and in addition have not actually matched the high thermal expansion of copper.

A further, and less commonly understood problem, has been to provide glass compositions which exhibit coefficients of thermal expansion substantially approaching that for aluminum, which has a coefficient of thermal expansion of $23-25 \times 10^{-6}$ per ° C. Prior to present invention there has been no indication that such a glass might be made.

Glasses matching the high thermal expansion characteristics of such metals and metal alloys as certain bronzes, German silver, stainless steel, etc., which all have expansion coefficients between approximately 17 and $19 \times 10^{-6}$ per 0 C., have likewise been sought for specialized applications such as enamel-type coatings, glass seals, glass solders, and the like, but have never been available prior to the present invention.

The problem of bonding together or of embedding certain particulate materials, e. g., synthetic mica, having high expansion coefficients ($13.5 \times 10^{-6}$ per ° C. for synthetic mica) using glass compositions is also one requiring the matching of thermal expansion coefficients in order to prevent cracking, warping, etc., as well as to maintain uniform electrical characteristics in the resulting article.

This invention is directed toward solutions of such problems as the foregoing and has as one of its primary objectives to provide a series of glass compositions of varied thermal expansion characteristics which may be used to match the high thermal expansion characteristics of a wide variety of materials and articles, such as those of the type aforementioned.

A further object is to provide certain glass compositions which possess unusual thermal expansion characteristics, improved electrical properties, and which in addition form fluid melts pourable at relatively low temperatures, i. e., from approximately 450° C. to 8000 C. and preferably below 700° C., so that various materials may be embedded in glass without deleteriously affecting their properties during the process. This is particularly important with respect to ensheathing or encasing wires, coils and other articles made of copper, which at high temperatures in the atmosphere suffers oxidative attack.

A further object of this invention is to provide crack-resistant glass-ensheathed copper conductors, e. g., transformers, which may be operated with great efficiency and without failure at higher temperatures than possible using prior art transformer constructions. Another object is to provide glass-encased metal articles which can withstand raised temperatures without such failure as cracking of the glass envelope, disruption of the uniform electrical properties of the glass seal around such articles, etc. Another is to provide improved glass-to-metal seals, improved capacitors, etc. And still another object is to provide glass coatings on various surfaces including metal foil or leaf. Other objects and advantages will be evident as this description proceeds.

High thermal expansion glasses, i. e., those with coefficients of thermal expansion above approximately $12 \times 10^{-6}$ per ° C. and approaching approximately $25 \times 10^{-6}$ per ° C., which is addition melt to a fluid pourable state at relatively low temperatures and possess other desired properties for application upon various surfaces, as well as for the encasement of thermally sensitive objects, have been found according to this invention to require in their make-up a substantial amount of certain low temperature glassformers. These glassformers by chemical analysis satisfy the requirements of the following table.

TABLE A

| | Approximate Parts By Weight |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 |

From the table it will be seen that approximately 25% or more of our total glass composition is $Sb_2O_3$, and that the required content of $Sb_2O_3$ is approximately 60% if no $As_2O_3$ is used. When $As_2O_3$ is used, it will not exceed approximately 70% of the total composition. The total content of $Sb_2O_3$ and any $As_2O_3$ present must equal approximately 60% of the composition and will not exceed approximately 98% by weight. $B_2O_3$, if present, does not exceed approximately 30% of the total composition and the total content of $Sb_2O_3$, $As_2O_3$, and $B_2O_3$ is maintained between the approximate limits of 60% and 98% by weight.

The aforementioned approximate limits are considered necessary for the cited low temperature glassformers because it has been found that, when a mixture of inorganic oxides contains amounts of these constituents below or above those set forth in the table, untoward results are obtained, e. g., results such as a loss of high thermal expansion properties, a loss of desired electrical properties, a great tendency toward hygroscopicity, or even a loss of glass formation. Other constituents in our glasses, of course, influence the characteristics and contribute to the resulting properties thereof. At this point, however, particular note should be taken of the approximate upper limit of boric oxide in our compositions. While it is very compatible with our glass systems, mixing well in various proportions with the other ingredients to form glass at very low temperatures, it serves to substantially lower the coefficient of thermal expansion exhibited by glasses in which it is a constituent, and does not contribute to the durability of such glasses. Accordingly, it is rather critical to maintain the total boric oxide content of our high-expansion glasses below an upper limit of approximately 30% by weight, and preferably, below an upper limit of approximately 20% by weight. While a small amount of boric oxide in our compositions desirably is present for the purpose of aiding glass formation, glasses of preferred properties can be formed, as will be evident from a study of this disclosure, without boric oxide.

In addition to satisfying the requirements of Table A, our glasses must contain approximately 2% or more by weight of at least one other compatible inorganic oxide in order to gain suitable stability in the resulting glass. This minimum quantity of compatible inorganic oxides is generally also necessary, particularly if $B_2O_3$ is not employed in the formulation, in order to provide compositions which form fluid and uniform glass melts of sufficient bulk and quantity to permit the dipping of articles therein. In general, one might characterize these other compatible inorganic oxides as durability promoting inorganic oxides, for we have found that inorganic oxides compatible with our low-temperature melts, that is, capable of forming a glass at temperatures not in excess of approximately 800° C. with ingredients satisfying the requirements of Table A, impart to the resulting glass an improved durability. Glasses hereof are durable in that they retain their body and structural strength and resist crumbling even under rather extreme conditions of weathering; they resist attack by water and exhibit substantially stable electrical properties even when exposed to rather severe weathering conditions. Of course, some compatible inorganic oxides, e. g., $SiO_2$, ZnO, and PbO, are more pronounced in their behavior in this respect in our compositions than others. For example, $SiO_2$, added in the form of finely divided silicic acid to a raw batch to be melted, is especially pronounced in its durability imparting behavior as compared to the behavior of alkali metal oxide. That alkali metal oxides behave at all to impart some durability to our glasses is in itself remarkable in view of their known fluxing properties. For the purpose of illustrating various compatible durability promoting oxides which must total approximately 2% or more by weight of our glass compositions, and preferably are present in our compositions above approximately 10% by weight of the total, the following table is set forth. Each oxide listed is individually an optional ingredient, and if specifically present, will not exceed the approximate percent by weight set forth in the table.

TABLE B

| | |
|---|---|
| $SiO_2$ | 0–8 |
| ZnO | 0–20 |
| PbO | 0–40 |
| $K_2O$ | 0–20 |
| $Na_2O$ | 0–10 |
| $Li_2O$ | 0–5 |

The first three oxides listed in the table are preferred components of our glasses from the standpoint of improved durability, as well as also from the standpoint of the stability imparted to a fluid glass melt, and preferably are present in an amount of at least 2% by weight or more. Amounts of these oxides in excess of the amounts specified in Table B, however, are generally incompatible with our glass systems. For example, amounts of $SiO_2$ in excess of that specified will cause difficulty in the formation of a low temperature melting glass possessing the properties here required and even upset the characteristic amorphous system of our unique thermally sensitive glass compositions, resulting in poor glass formations or no glass formation. Small amounts of metal oxides other than those specified in Table B may be used in our compositions provided they are compatible with our basic system containing a required content of low temperature glassformers as specified in Table A, and provided they go into solution with other components of the basic system to form a glass at raised temperatures below approximately 800° C. Zirconium dioxide and other highly refractory oxides, however, are not compatible with our glasses, i. e., these refractory oxides do not go into solution with the other components of our system to form a glass at low temperatures.

Preferably the quantity of compatible inorganic oxides in our compositions is 10% or above, with the maximum quantity of low temperature glassformers specified in Table A appropriately reduced to 90% or below. Preferably also, as pointed out above, the total quantity of $SiO_2$, ZnO, and PbO in our glasses is 2% or more by weight.

With the foregoing in mind, our invention will be described in greater detail with respect to distinct and specific embodiments which are particularly adapted for certain technical applications, as will be explained.

Within our board group of glasses is a more limited group which possesses a unique combination of properties found to be particularly useful in the electrical art for the encasement, or ensheathing of copper electrical apparatus such as copper wound transformers, etc., as well as for the encasement of copper or copper alloy windings of gyroscope motors or other apparatus. These glasses possess coefficients of thermal expansion between approximately 15 and $17 \times 10^{-6}$ per ° C. For most purposes, it is preferable to embed copper articles in glass compositions hereof which possess equal or slightly lower coefficients of thermal expansion than the copper. If desired, however, the coefficient of thermal expansion of copper, which is approximately $17 \times 10^{-6}$ per ° C., can be exactly matched. We have found that copper apparatus may be embedded with glasses hereof possessing thermal expansion coefficients between 15 and $17 \times 10^{-6}$ per ° C., or even those with slightly lower or higher thermal coefficients, without danger of the glass sheath cracking as the structure is subjected to changes in temperature.

These glass compositions which may be used to ensheath copper form fluid melts at relatively low temperatures, i. e., between approximately 450° C. and 700° C., and have softening points, i. e., solidus temperatures, ranging from slightly above about 250° C. to 350° C. In the encasement of copper articles care must be taken to avoid exposing the copper to high temperatures in the atmosphere inasmuch as the copper is thereby oxidized. Therefore, the glasses hereof forming fluid melts at comparatively low temperatures are especially desirable.

We accomplish the encasement of copper articles by first heating our glasses to a fluid state and then quickly ensheathing the copper article with the molten glass before the copper is sufficiently raised in temperature while exposed to the atmosphere to allow oxidation to take place. Once ensheathed with our glass, the copper is no longer accessible to the air and hence not adversely affected by high temperatures. Ensheathing of a copper article in a glass hereof may be accomplished suitably by quickly pouring a glass melt over the copper article after positioning it in a mold, or by immersing the copper article into a vessel containing a glass melt of this invention, or by dipping the copper article in a glass melt and quickly removing the article from the melt, the last-named procedure resulting in a rather thin sheath of glass covering the article. Ensheathing of copper may also be accomplished by painting or spraying a slip formed using a glass frit hereof upon copper and heating the same to a maturing temperature between approximately 400–600° C. After the copper article is ensheathed with molten glass the whole structure is cooled quickly to a temperature at which the glass solidifies. Thereafter the structure is gradually cooled to room temperature. If desired, the material of the mold or container may then be torn from the glass encased copper article if cooling was accomplished with the article positioned in a mold or vessel.

Our glass compositions especially useful as sheaths around copper articles, as well as all the glass compositions hereof, possess remarkably high dielectric constants, a surprising fact particularly in view of their low melting or solidus temperatures. Generally the dielectric constant of our glass is above approximately 10 when measused at one kc. and 25° C. At higher or lower frequencies the value varies only rather slightly from that obtained at 1 kc.

Power losses are extremely small in our glasses, dissipation factors as low as 0.002 at 1 kc. and 25° C. not being uncommon. In all glasses tested, dissipation factors below 0.005 at 1 kc. and 25° C. were found, and no glass coming within the broad scope of our invention is believed to have a dissipation factor above 0.01 under these conditions. At 200° C. the dissipation factors of all of our glasses which were tested exhibited some increase but were all below 0.05. These electrical properties are particularly beneficial when our glasses are used to ensheath copper wound transformers. The resulting ensheathed transformer is capable of operating at rather high temperatures on the order of even 250° C. without failure, i. e., with good insulation and without excessive power losses. This permits transformers to operate at higher temperatures than possible using conventional organic insulation.

In addition to the foregoing enumerated properties, these glasses useful on copper articles do not corrode copper and are mechanically strong and durable. Particularly important is their resistance to alteration in their electrical characteristics with changes in atmospheric humidity. All of these required properties long sought but not previously attained in glass compositions for an application such as this are met in the following illustrative examples of this invention.

Examples 1 through 8 in Table I, particularly Example 1, illustrate preferred glasses for the encasement of copper structures. They have a slightly better durability and weather-resistance and are more stable in electrical characteristics than glasses formed of components outside the preferred range but within the permissible range set forth in Table C.

To illustrate a specific method for ensheathing copper transformers, the glass of Example 1 above was heated to about 600° C., and a copper coil then dipped in the glass melt, quickly removed and allowed to cool to room temperature. The resulting glass ensheathed coil did not crack on cooling to room temperature. The glass sheath remained clear and transparent and the coil remained bright indicating that it was not attacked by the glass.

While arsenic trioxide is to be avoided in thermally sensitive glass compositions hereof used in contact with copper structures, it is a desired constituent in our glasses used in contact with aluminum surfaces, causing pronounced adhesion of the glass to aluminum or aluminum alloys. One of the most outstanding features of the present invention is that glasses are now provided which possess thermal expansion coefficients approaching the value for aluminum. Exemplary glasses with such high coefficients of thermal expansion are set forth in Table II hereof. Glasses for coating aluminum, however, need not possess such a high coefficient as that of aluminum in order to be useful. They may have substantially lower coefficients of thermal expansion without untoward cracking resulting whenever the glass is formed as an enamel-type coating upon an aluminum or aluminum alloy sur-

TABLE I

| Ex. No. | 1 | 2 | 3 | 4 | 5 | 6 | 7 | 8 | 9 | 10 |
|---|---|---|---|---|---|---|---|---|---|---|
| $Sb_2O_3$ | 65 | 80.6 | 69.3 | 76.8 | 75.2 | 78.7 | 76.2 | 78.2 | 70.0 | 90 |
| $B_2O_3$ | 5 | 4.8 | 4.7 | 6.9 | 4.5 | 4.7 | 4.5 | 6.2 | 11.0 | 5 |
| $SiO_2$ | 3 | | | | | | | | | |
| ZnO | | 2.8 | | 2.7 | | 2.8 | 2.7 | 7.3 | | |
| PbO | 19 | 7.7 | 22.7 | 7.3 | 14.4 | 7.5 | 7.3 | | | 5 |
| $K_2O$ | 8 | 2.2 | 3.2 | 6.2 | 6.0 | 6.3 | 9.2 | 8.4 | 19.0 | |
| $Na_2O$ | | 1.2 | | | | | | | | |
| $Li_2O$ | | 0.7 | | | | | | | | |
| (a) | 16.5 | 15.0 | 15.3 | 15.4 | 15.5 | 15.6 | 16.9 | 16.9 | 15.8 | 16.4 |
| (b) | | 311 | 290 | 278 | 295 | 293 | 288 | 304 | 330 | 282 |
| (c) | 600–650 | 600–650 | 600–650 | 600–650 | 600–650 | 600–650 | 600–650 | 600–650 | 650–700 | 600–650 |
| (d) | | 15.5 | | 17.0 | 16.1 | 15.2 | 14.2 | 13.0 | | |
| (e) | | .0025 | | .003 | .0026 | .0025 | .0029 | .0020 | | |

(a) Coefficient of linear expansion per ° C. ($\times 10^{-6}$).
(b) Softening point, ° C.
(c) Preferred pouring range in ° C.
(d) Dielectric constant at 1 kc. and 25° C.
(e) Dissipation factor at 1 kc. and 25° C.

From the table, it will be observed that glass compositions hereof which possess required properties for ensheathing copper articles do not contain $As_2O_3$. This metal oxide is to be avoided because it causes glasses in which it is present to attack and corrode copper or copper containing articles. Essentially these glasses consist of the metal oxides set forth in Table C within the approximate percentage ranges therein specified. The preferred weight percentage amounts of the inorganic oxides in these particular compositions as well as the permissible broad range is set forth.

TABLE C

| | Parts by Weight | |
|---|---|---|
| | Permissible | Preferred |
| $Sb_2O_3$ | 60–90 | 60–85 |
| $B_2O_3$ | 0–15 | 1–10 |
| $Sb_2O_3+B_2O_3$ | 65–95 | 65–90 |
| $SiO_2$ | 0–8 | 0–6 |
| ZnO | 0–10 | 0–10 |
| PbO | 0–25 | 0–25 |
| $SiO_2+ZnO+PbO$ | 0–30 | 5–25 |
| $K_2O$ | 0–20 | 0–20 |
| $Na_2O$ | 0–10 | 0–10 |
| $Li_2O$ | 0–5 | 0–5 | face. A particularly desirable glass for application to aluminum surfaces is set forth in Example 11.

*Example 11*

| | |
|---|---|
| $Sb_2O_3$ | 54.3 |
| $As_2O_3$ | 22.2 |
| $B_2O_3$ | 5.2 |
| ZnO | 3.0 |
| PbO | 8.3 |
| $K_2O$ | 7.0 |

This glass exhibits excellent durability and mechanical strength, has a coefficient of thermal expansion of $16.4 \times 10^{-6}$ per ° C., a dielectric constant of 16.3 at 1 kc. and 25° C., a dissipation factor of 0.003 at 25° C., a softening point of about 285° C., and forms a fluid melt readily pourable at about 550–650° C. As with other glasses hereof, it may be applied as a frit to a surface and matured into a smooth glossy enamel-type coating at low temperatures. This is an important advantage when coating aluminum inasmuch as aluminum loses its structural strength at high temperatures. A glass coating such as set forth in Example 11 is particularly preferred for aluminum or aluminum alloy articles. It was applied to an aluminum surface as a glass frit suspended in a slip formulation and matured, i. e., fused, at the low temperature of approximately 400° C. into a smooth, glossy enamel-type coating. A typical well-known slip formulation to accomplish this is a mixture containing about 9 grams of anhydrous $Na_2B_4O_7$, 9 grams of anhydrous $Na_2SiO_3$ and about 300 cubic centimeters of water. 300 grams of frit was added to this mixture prior to milling it to optimum fineness, e. g., minus 325 mesh, for application to the aluminum surface.

Glasses hereof suitable to bond together particles of synthetic mica, which has a coefficient of thermal expansion of approximately $13.5 \times 10^{-6}$ per ° C., may vary in thermal expansion from approximately 12 to $15 \times 10^{-6}$ per ° C. Several suitable glasses for this application, as well as other applications, are also set forth in Table II hereof. A particularly preferred glass for embedding mica follows:

*Example 12*

|   | Parts by weight |
|---|---|
| $Sb_2O_3$ | 82.2 |
| $B_2O_3$ | 4.9 |
| ZnO | 2.9 |
| PbO | 7.9 |
| $Li_2O$ | 2.1 |

This glass has a coefficient of thermal expansion of $13.3 \times 10^{-6}$ per ° C., a softening point of 309° C. and pours as a fluid melt around 600–650° C. When used to embed mica, the particles of mica are mixed with the glass frit, pressed into a pre-formed article and heated to approximately 450° C. to fuse the same into a unitary piece. The resulting article exhibits remarkably stable and uniform electrical properties and may be used satisfactorily as a high temperature, or high voltage, corona resistant insulator.

Other exemplary glasses of this invention are set forth in Table II in weight percent. In the column labeled "$C \times 10^6$" are set forth thermal coefficients of expansion per ° C. These figures are one million times the actual thermal coefficient. In the column labeled "S" are set forth softening points in ° C. A preferred pouring range or range at which the glasses form fluid melts easily used in manufacturing processes (i. e., "working range"), is set forth in degrees centigrade in the column called "P. R."

crucibles mixtures of inorganic oxides such as $Sb_2O_3$, $As_2O_3$, $Na_2O$, etc., or oxide-yielding materials such $H_2SiO_3$, $K_2CO_3$, etc., in appropriate amounts to give compositional analyses within the weight percentage ranges herein specified. A mixture of raw ingredients melts to form a fluid mass between approximately 450 and 800° C. Any suitable kiln or furnace may be used; and after melting, the glass is quenched in any suitable manner. For example, if it is desired to form rods, the glass may be quenched by pouring it in the angle of a cool angle iron. If a glass frit is desired, the glass melt is preferably quenched by pouring the same in a cool bath of water and thereafter grinding the solid glass particles. Glass frits of this invention mature as enamel-type coatings at temperatures on the order of between about 400–600° C.

Various coloring agents and fillers, both conductive and non-conductive, e. g., iron oxide, powdered copper or aluminum or other metals, etc., may be incorporated in our glasses to achieve unusual effects, if desired.

Since our glasses possess unusually high dielectric constants and other desirable electrical properties, they are also suitable to use as the dielectric in capacitors. Advantageously, such capacitors can withstand rather great extremes of temperature inasmuch as the electrodes fastened to the dielectric, and the dielectric itself, may be matched in thermal expansion. To illustrate, the glass of Example 13 may be used as a dielectric between silver or silver alloy electrodes (suitably a silver-copper alloy having an expansion coefficient of about $18 \times 10^{-6}$ per ° C.) and the whole capacitor encased, if desired, with a sheath of the glass of Example 13. Any capacitors ensheathed with a glass of this invention will be found to exhibit remarkable resistance to breakdown at increased voltages.

A unique spiral capacitor construction, not before available, is also now provided in the art. Glass frits hereof in the form of a slip using a suspending agent such as polyisobutylene in heptane, may be coated upon silver or other conductive metal leaf. Of course, coefficients of expansion may be matched. Such a coated metal leaf or foil and another foil or leaf of metal with a similar frit coating except for possible margin areas (for fastening electrical current connectors to the leaf or foil) are then rolled into a spiral and fused suitably at tempera-

TABLE II

| Ex.No. | $Sb_2O_3$ | $As_2O_3$ | $B_2O_3$ | $SiO_2$ | ZnO | PbO | $K_2O$ | $Na_2O$ | $Li_2O$ | $C \times 10^6$ | S | P. R. |
|---|---|---|---|---|---|---|---|---|---|---|---|---|
| 13 | 90.3 | | | | | 9.7 | | | | 18.5 | 260 | 600–650 |
| 14 | 83.0 | | | | | 14.0 | | | | 19.4 | 280 | 600–650 |
| 15 | 93.4 | | | | | | 6.6 | | | | | 600–650 |
| 16 | 95.1 | | | | | | | | 4.9 | | | 650–700 |
| 17 | 41.0 | 27.3 | | | | 31.7 | | | | 12.8 | 287 | 600–650 |
| 18 | 43.8 | 44.8 | | | | | 11.4 | | | 21.2 | 252 | 550–600 |
| 19 | 73.4 | | | | | 18.7 | 7.9 | | | 19.2 | 250 | 550–600 |
| 20 | 78.1 | | 9.3 | | | | 12.6 | | | 17.5 | 290 | 600–650 |
| 21 | 60 | | 30.0 | | | | 10.0 | | | 14.1 | 367 | 700–750 |
| 22 | 68 | | 15 | | | 17 | | | | 12.2 | 342 | 650–700 |
| 23 | 63 | | 5 | | | 32 | | | | 14.2 | 283 | 600–650 |
| 24 | 65.6 | | 3.9 | | | 25.1 | 5.3 | | | | | |
| 25 | 69.4 | | 5.5 | | | 17.7 | 7.5 | | | 17.3 | 273 | 600–650 |
| 26 | 81.0 | | 4.8 | | 2.8 | 7.7 | 3.6 | | | | | 600–650 |
| 27 | 80.5 | | 4.8 | | 2.8 | 7.7 | 3.3 | | 1.0 | 14.5 | 282 | 600–650 |
| 28 | 81.6 | | 4.9 | | 2.8 | 7.8 | | 1.8 | 1.0 | | | |
| 29 | 81.6 | | 5.1 | | 5.9 | | | 2.3 | 1.3 | 0.7 | | |
| 30 | 45.1 | 30.6 | 5.4 | | | 3.1 | 8.6 | 7.3 | | | 18.4 | 255 | 550–600 |
| 31 | 87.3 | | | 3 | | | 9.7 | | | 18.2 | 292 | |
| 32 | 84.6 | | | 6 | | | 9.4 | | | | | |
| 33 | 70 | | | 3 | | 18 | 9 | | | 19.5 | 275 | 600–650 |
| 34 | 65 | 5 | | 3 | | 20 | 5 | 1 | 1 | 3.3 | 312 | |

The glass of Example 13 in the foregoing table exhibited a dielectric constant of 17.5 at 1 kc. and 25° C., and a dissipation factor of 0.004 at 25° C. While it possesses a rather high coefficient of thermal expansion for use on copper, it has been found suitable, although not preferred for such a use. Its coefficient of expansion closely approaches that of certain bronzes, stainless steel, etc.

Our glasses may be prepared by melting in porcelain tures between approximately 300–500° C., which temperatures are well below the melting point of conductive metals suitable to use as the electrodes of a capacitor, e. g., conductive metals such as aluminum, copper, etc., as well as others. Desirably, a pulverized highly refractory oxide such as $ZrO_2$, $Al_2O_3$, etc., which does not go into solution with the other components of our glass system to form a glass at the low temperatures employed, is mixed with our slip prior to coating, or sprinkled over our coated slip, when making these spiral capacitors. The refractory oxide remains in particulate form and is not altered by the fusion step, which must take place below the melting temperature of the metal leaf. In other words, fusion must take place well below 800° C. in order to prevent damage to the metal foil electrodes. The refractory oxide services as a spacing medium to prevent the layers of conductive metal leaf from contacting each other during the fusion step and does not adversely affect the electrical characteristics of the resulting capacitor.

For example, 300 grams of the glass of Example 11 in the form of a frit was mixed with 50 grams of finely pulverized $ZrO_2$, 4 grams of methyl cellulose, and 400 grams of water to form a slip which was then coated at a coating thickness of 0.0005" upon a 0.001" aluminum metal foil. The water was evaporated at 80° C. In making this illustrative coating composition, the finely pulverized $ZrO_2$ was prepared by ball milling minus 325 mesh $ZrO_2$ particles to further reduce the size of the particles, so that the particles sizes were no greater than the aforespecified coating thickness of 0.0005". A like further layer of the foil and slip was then formed into a laminate with the first mentioned coated leaf. The laminate was then rolled and fired at 450° C. for about 5 minutes.

Other metals such as Nichrome alloy may also be used in contact with these glasses. Thermal expansion coefficients, of course, may be matched. Fine wires, as well as other surface areas, of various materials may be coated with our glasses to insulate and protect the same from corrosion and other attack.

Glasses made according to this invention, for example, one such as set forth in Example 27, may also be used to seal copper to synthetic mica, or other highly refractory inorganic materials, by the step of merely melting the glass between the materials, or so as to completely surround the materials, including bonding of particulate inorganic materials. The advantage of this technique will be readily apparent when it is realized that it renders unnecessary the tedious procedure of employing titanium core solder, titanium hydride and vacuum heating now required in sealing cooper to mica.

We claim:

1. A durable glass having high thermal expansion and pourable as a fluid melt at raised temperatures below approximately 800° C. consisting essentially of between 60 and 98% by weight of low temperature glassformers and between 40 and 2% by weight of compatible durability imparting inorganic oxides, said compatible oxides being inorganic oxides capable of going into solution with said low temperature glassformers to form a homogeneous glass melt at raised temperatures below approximately 800° C., and said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 |

2. A durable glass having high thermal expansion and pourable as a fluid melt at 450–800° C. consisting essentially of between 60 and 90% by weight of low temperature glassformers and between 40 and 10% by weight of compatible durability imparting inorganic oxides, said compatible oxides being inorganic oxides capable of going into solution with said low temperature glassformers to form a homogeneous glass melt at temperatures between 450° and 800° C., and said low temperature glassformers being inorganic oxides having a compositional analysis which satisfies the requirements of the following table wherein approximate amounts are specified in weight percent:

| | |
|---|---|
| $Sb_2O_3$ | 25–90 |
| $As_2O_3$ | 0–65 |
| $Sb_2O_3+As_2O_3$ | 60–90 |
| $B_2O_3$ | 0–20 |
| $Sb_2O_3+As_2O_3+B_2O_3$ | 60–90 |

3. A durable glass having high thermal expansion and pourable as a fluid melt at 450–800° C. comprising $SiO_2$ up to 8% by weight and from about 60 to 98% by weight of low temperature glassformers, said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 | any remainder of the glass being made up of inorganic oxides compatible with said components.

4. A durable glass having high thermal expansion and pourable as a fluid melt at 450–800° C., comprising ZnO up to 20% by weight and from about 60 to 98% by weight of low temperature glassformers, said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 | any remainder of the glass being made up of inorganic oxides compatible with said components.

5. A durable glass having high thermal expansion and pourable as a fluid melt at 450–800° C. comprising PbO up to 40% by weight and from about 60 to 98% by weight of low temperature glassformers, said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 | any remainder of the glass being made up of inorganic oxides compatible with said components.

6. A durable glass having high thermal expansion and pourable as a fluid melt at 450–800° C. consisting essentially of inorganic oxides having a compositional analysis within the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 |
| $SiO_2$ | 0–8 |
| ZnO | 0–20 |
| PbO | 0–40 |
| $K_2O$ | 0–20 |
| $Na_2O$ | 0–10 |
| $Li_2O$ | 0–5 |

7. A durable glass having a coefficient of thermal expansion between approximately 15 and $17 \times 10^{-6}$ per °C., characterized by being non-corrosive to copper materials, said glass consisting essentially of inorganic oxides having a compositional analysis within the following table wherein approximate amounts are specified in weight percent:

| | |
|---|---|
| $Sb_2O_3$ | 60–90 |
| $B_2O_3$ | 0–15 |
| $Sb_2O_3+B_2O_3$ | 65–95 |
| $SiO_2$ | 0–8 |
| ZnO | 0–10 |
| PbO | 0–25 |
| $SiO_2+ZnO+PbO$ | 0–30 |
| $K_2O$ | 0–20 |
| $Na_2O$ | 0–10 |
| $Li_2O$ | 0–5 |

8. A durable glass having a coefficient of thermal expansion between approximately 15 and $17\times10^{-6}$ per °C. and characterized by being non-corrosive to copper materials, said glass consisting essentially of inorganic oxides having a compositional analysis within the following table wherein approximate amounts are specified in weight percent:

| | |
|---|---|
| $Sb_2O_3$ | 60–85 |
| $B_2O_3$ | 1–10 |
| $Sb_2O_3+B_2O_3$ | 65–90 |
| $SiO_2$ | 0–6 |
| ZnO | 0–10 |
| PbO | 0–25 |
| $SiO_2+ZnO+PbO$ | 5–25 |
| $K_2O$ | 0–20 |
| $Na_2O$ | 0–10 |
| $Li_2O$ | 0–5 | said glass exhibiting a dielectric constant above 10 and a dissipation factor below 0.005 at 25° C.

9. A durable glass having a coefficient of thermal expansion above $12\times10^{-6}$ per °C. consisting essentially of alkali metal oxide and over 60% by weight of $Sb_2O_3$.

10. An article of manufacture comprising a material of high thermal expansion and bonded thereto, a durable glass of high thermal expansion characterized by being pourable as a fluid melt at raised temperatures below approximately 800° C. and consisting essentially of between 60 and 98% by weight of low temperature glassformers and between 40 and 2% by weight of compatible durability imparting inorganic oxides, said compatible oxides being inorganic oxides capable of going into solution with said low temperature glassformers to form a homogeneous glass melt at raised temperatures below approximately 800° C., and said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 |

11. An article of manufacture comprising a metal material of high thermal expansion and, bonded thereto, a crack-resistant coating comprising a durable glass characterized by being pourable as a fluid melt at 450–800° C. and consisting essentially of inorganic oxides having a compositional analysis within the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 |
| $SiO_2$ | 0–8 |
| ZnO | 0–20 |
| PbO | 0–40 |
| $K_2O$ | 0–20 |
| $Na_2O$ | 0–10 |
| $Li_2O$ | 0–5 |

12. An article of manufacture comprising a sheet of metal foil and, bonded thereto, a layer of a durable glass of high thermal expansion characterized by being pourable as a fluid melt at raised temperatures below approximately 800° C. and consisting essentially of between 60 and 98% by weight of low temperature glassformers and between 40 and 2% by weight of compatible durability imparting inorganic oxides, said compatible oxides being inorganic oxides capable of going into solution with said low temperature glassformers to form a homogeneous glass melt at raised temperatures below approximately 800° C., and said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 |

13. The article of manufacture of claim 12 in the layer of durable glass of which is uniformly dispersed a pulverized highly refractory inorganic oxide not compatible to form a glass with the components of said durable glass at temperatures below 800° C.

14. The article of manufacture of claim 13 in spiral form.

15. An article of manufacture comprising a material of high thermal expansion and bonded thereto, a durable glass of high thermal expansion characterized by being pourable as a fluid melt at 450–800° C., and consisting essentially of between 60 and 90% by weight of low temperature glassformers and between 40 and 10% by weight of compatible durability imparting inorganic oxides, said compatible oxides being inorganic oxides capable of going into solution with said low temperature glassformers to form a homogeneous glass melt at temperatures between 450° and 800° C., and said low temperature glassformers being inorganic oxides having a compositional analysis which satisfies the requirements of the following table wherein approximate amounts are specified in weight percent:

| | |
|---|---|
| $Sb_2O_3$ | 25–90 |
| $As_2O_3$ | 0–65 |
| $Sb_2O_3+As_2O_3$ | 60–90 |
| $B_2O_3$ | 0–20 |
| $Sb_2O_3+As_2O_3+B_2O_3$ | 60–90 |

16. An article of manufacture comprising a material of high thermal expansion and bonded thereto, a durable glass of high thermal expansion characterized by being pourable as a fluid melt at 450–800° C., and comprising $SiO_2$ up to 8% by weight and from about 60 to 98% by weight of low temperature glassformers, said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 | any remainder of the glass being made up of inorganic oxides compatible with said components.

17. An article of manufacture comprising a material of high thermal expansion and bonded thereto a durable glass of high thermal expansion characterized by being pourable as a fluid melt at 450–800° C., and comprising ZnO up to 20% by weight and from about 60 to 98% by weight of low temperature glassformers, said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 | any remainder of the glass being made up of inorganic oxides compatible with said components.

18. An article of manufacture comprising a material of high thermal expansion and bonded thereto a durable glass of high thermal expansion characterized by being pourable as a fluid melt at 450–800° C., and comprising PbO up to 40% by weight and from about 60 to 98% by weight of low temperature glassformers, said low temperature glassformers being inorganic oxides having a compositional analysis which satisfies the requirements of the following table wherein approximate amounts are specified in weight percent:

| | |
|---|---|
| $Sb_2O_3$ | 25–98 |
| $As_2O_3$ | 0–70 |
| $Sb_2O_3+As_2O_3$ | 60–98 |
| $B_2O_3$ | 0–30 |
| $Sb_2O_3+As_2O_3+B_2O_3$ | 60–98 | any remainder of the glass being made up of inorganic oxides compatible with said components.

19. An article of manufacture comprising an article having a copper surface and, bonded thereto, a layer of a durable glass having a coefficient of thermal expansion of between approximately 15 and 17×10⁻⁶ per ° C., said glass characterized by being non-corrosive to copper materials and consisting essentially of inorganic oxides having a compositional analysis within the following table wherein approximate amounts are specified in weight percent:

| | |
|---|---|
| $Sb_2O_3$ | 60–90 |
| $B_2O_3$ | 0–15 |
| $Sb_2O_3+B_2O_3$ | 65–95 |
| $SiO_2$ | 0–8 |
| ZnO | 0–10 |
| PbO | 0–25 |
| $SiO_2+ZnO+PbO$ | 0–30 |
| $K_2O$ | 0–20 |
| $Na_2O$ | 0–10 |
| $Li_2O$ | 0–5 |

20. An article of manufacture comprising an article having a copper surface and, bonded thereto, a layer of a durable glass having a coefficient of thermal expansion of between approximately 15 and 17×10⁻⁶ per ° C., said glass characterized by being non-corrosive to copper materials and consisting essentially of inorganic oxides having a compositional analysis within the following table wherein approximate amounts are specified in weight percent:

| | |
|---|---|
| $Sb_2O_3$ | 60–85 |
| $B_2O_3$ | 1–10 |
| $Sb_2O_3+B_2O_3$ | 65–90 |
| $SiO_2$ | 0–6 |
| ZnO | 0–10 |
| PbO | 0–25 |
| $SiO_2+ZnO+PbO$ | 5–25 |
| $K_2O$ | 0–20 |
| $Na_2O$ | 0–10 |
| $Li_2O$ | 0–5 | said glass exhibiting a dielectric constant above 10 and a dissipation factor below 0.005 at 25° C.

References Cited in the file of this patent

Keonig et al.: Literature Abstracts of Ceramic Glazes (1951), pp. 267–268.

UNITED STATES PATENT OFFICE

CERTIFICATE OF CORRECTION

Patent No. 2,863,782 December 9, 1958

William R. Eubank et al.

It is hereby certified that error appears in the printed specification of the above numbered patent requiring correction and that the said Letters Patent should read as corrected below.

Column 1, line 44, for "per O. C.," read -- per $°C.$, --; line 67, for "8000 C." read -- $800°C.$ --; column 2, line 20, for "which is" read -- which in --; column 4, line 14, for "board" read -- broad --; column 5, lines 2 and 3, for "measused" read -- measured --; columns 7 and 8, Table II, under the heading "$CX10^6$" last line thereof, for "3.3" read -- 13.3 --; column 9, line 43, for "cooper" read - copper --.

Signed and sealed this 10th day of March 1959.

(SEAL)
Attest:

KARL H. AXLINE
Attesting Officer

ROBERT C. WATSON
Commissioner of Patents